(12) United States Patent
Hopper et al.

(10) Patent No.: US 6,404,866 B1
(45) Date of Patent: Jun. 11, 2002

(54) TELEPHONE CALLING ACCOUNT SYSTEM AND METHOD

(75) Inventors: Eric L. Hopper, Portland; Keith E. Steele, West Linn; Douglas M. Fieldhouse, Lake Oswego, all of OR (US)

(73) Assignee: Vesta Corporation, Portland, OR (US)

( * ) Notice: Subject to any disclaimer, the term of this patent is extended or adjusted under 35 U.S.C. 154(b) by 0 days.

(21) Appl. No.: 09/436,977

(22) Filed: Nov. 9, 1999

(51) Int. Cl.[7] .................................. H04M 15/00

(52) U.S. Cl. .............. 379/114.15; 379/111; 379/114.19; 379/144.01; 705/18

(58) Field of Search ................... 379/91.01, 91.02, 379/114, 115, 121, 130, 140, 144; 705/14, 16, 17, 18, 21; 235/380, 381, 382

(56) References Cited

U.S. PATENT DOCUMENTS

| 4,706,275 A | | 11/1987 | Kamil | 379/144 |
| 5,825,863 A | | 10/1998 | Walker | 379/144 |
| 5,892,827 A | * | 4/1999 | Beach et al. | 380/24 |
| 5,915,007 A | * | 6/1999 | Klapka | 379/144 |

FOREIGN PATENT DOCUMENTS

| WO | WO99/03057 | * | 1/1999 | G06K/5/00 |

* cited by examiner

*Primary Examiner*—Binh Tieu
(74) *Attorney, Agent, or Firm*—Kolisch Hartwell Dickinson McCormack & Heuser (57) ABSTRACT

A telephone calling account system, method, and card. The method typically includes determining a preexisting account designator of a preexisting account, creating a telephone calling account on a calling platform, and assigning to the telephone calling account the preexisting account designator of the preexisting account.

25 Claims, 4 Drawing Sheets

TELEPHONE CALLING ACCOUNT SYSTEM AND METHOD

TECHNICAL FIELD

This invention relates generally to telephony, and more particularly to telephone calling accounts.

BACKGROUND OF THE INVENTION

Millions of consumers each year make telephone calls using stored-value telephone calling accounts. These calling accounts are accessed most commonly by reference to a telephone calling card with an account number printed thereon. Calling accounts enable users to place local, long distance, and international calls from virtually any public or private telephone and charge the call to a calling account maintained by a telephone calling card service provider. The cost of the call is deducted from the balance stored in the calling account. As the balance in the calling account is exhausted, the account may be recharged by the user.

A stored-value calling account offers the convenience of centralized billing, without any charge to the actual telephone line used to make the call. Therefore, the calling party need not insert coins to make a call from a public telephone, or reimburse a private party for calls placed on a private telephone.

One problem with current stored-value calling cards is that they add to the proliferation of cards and account numbers in the modern consumer's life. Users of stored-value telephone cards typically already have one or more credit cards, mileage cards, gas cards, dining cards, discount cards, membership cards, rewards cards, etc. in their possession. Current stored-value telephone calling accounts require the user to carry an additional card, and/or memorize an additional account number. Because space in the user's wallet or purse is limited, it would be desirable to provide a stored-value telephone calling account that does not require an additional card and account number to be utilized.

Another problem of current stored-value accounts is that they are not capable of being assigned an account number from one of the other cards already possessed by the user. Assigning the account number of a preexisting card owned by the user to a stored-value telephone calling account would decrease the overall number of account numbers required by the user, as well as add an attractive calling feature to the preexisting card.

SUMMARY OF THE INVENTION

A telephone calling account system, method, and card are provided. The method typically includes determining a preexisting account designator of a preexisting account, creating a telephone calling account on a calling platform, and assigning to the telephone calling account the preexisting account designator of the preexisting account.

The system typically includes a calling platform, a database configured to store an account number corresponding to a calling account on the calling platform, and a remote server linked to the database. Typically, the remote server is configured to instruct the account database to create a new account on the platform having a predetermined account number. The predetermined account designator may be the same as a preexisting account designator of a preexisting account The card typically includes a surface and an account designator imprinted upon the surface. The account designator typically is associated with a first, preexisting account, and with a second, later established account. The second, later established account is typically a telephone calling account.

DETAILED DESCRIPTION OF THE PREFERRED EMBODIMENTS

Figure 1:
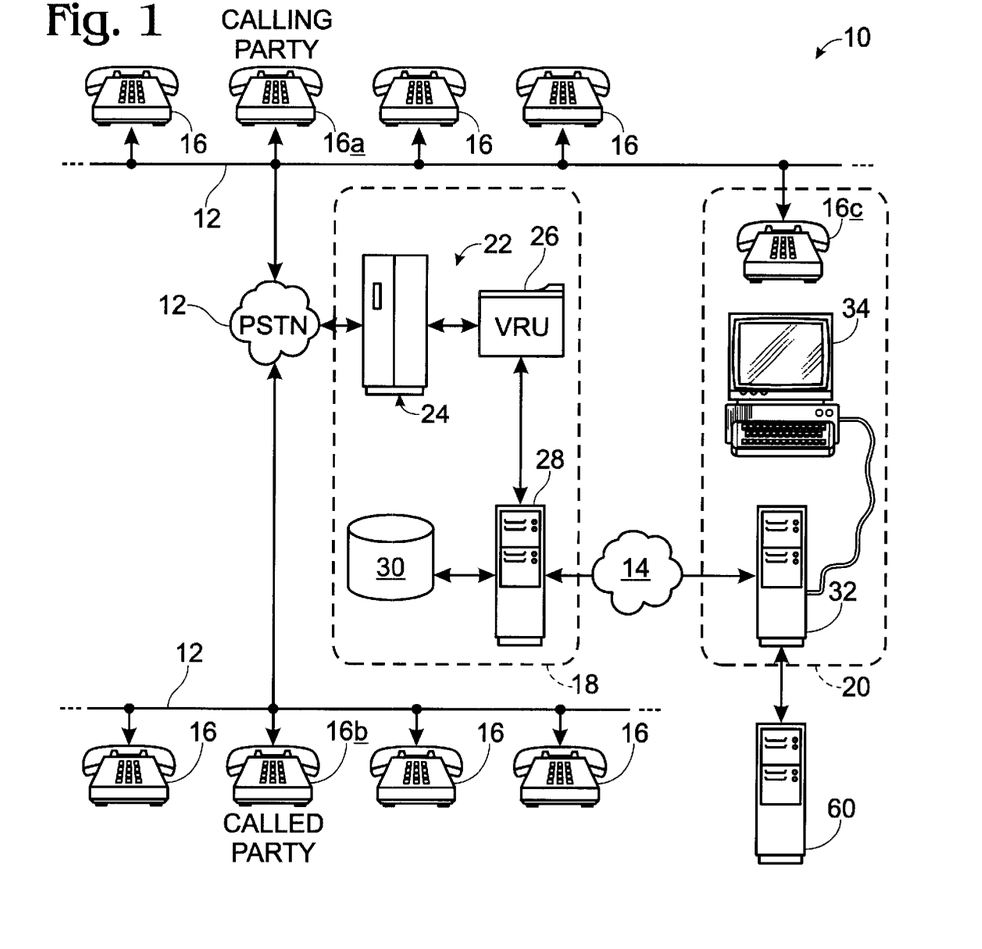
FIG. 1 is a schematic view of a telephone system according to one embodiment of the present invention.

Referring initially to FIG. 1, one embodiment of a telecommunications system according to the present invention is shown generally at 10. Telecommunications system 10 includes a telephone network 12 and a computer network 14. Typically, telephone network 12 is the Public Switched Telephone Network (PSTN), the global public telephone network accessible by most public and private telephones. Alternatively, telephone network 12 may be any other telephone network configured to transmit voice data, including a private telephone network, a local telephone network, or a packet-switched telephone network such as the Internet.

A plurality of telephones 16 are connected to telephone network 12. A call may be connected via telephone network 12 between any pair of telephones on the network. For example, a call may be connected between a telephone 16a of a calling party and a telephone 16b of a called party.

Computer network 14 typically is a Frame Relay Cloud. A Frame Relay Cloud is a type of network that operates on the Frame Relay network access protocol. Frame Relay Clouds generally are known to those of ordinary skill in the telecommunications networking arts, and are not described in detail herein. Components for constructing a Frame Relay Cloud are commercially available from U.S. West, Inc., of Denver, Colo., and other manufacturers. Alternatively, computer network 14 may be a dedicated Ethernet connection, or other type of packet switched network with guaranteed minimum data transfer rates. Computer network 14 also may be a private Local Area Network (LAN), a private Wide Area Network (WAN), a public computer network such as the Internet, or other virtually any other network capable of transmitting data between computers, and may not utilize guaranteed minimum data transfer rates.

It will be understood that the present invention also may be implemented in a computer-based telephony environment, and computer network 14 and telephone network 12 may be a single network, such as the Internet, capable of transmitting both voice and data. In this embodiment of the invention, any of telephones 16 may be a computer terminal that is equipped with speakers, microphones, and/or a headset and is configured to implement software to enable Voice Over Internet Protocol (VOIP) telephony. Computer terminals and associated software for enabling VOIP telephony are well known in the art.

Telephone network 12 and computer network 14 each connect a call processing center 18 and a customer service center 20. Call processing center 18 and platform 22 typically are run by a long-distance carrier such as QWEST of Denver, Colo. and customer service center 20 typically is run by a stored-value card service provider such as Carrier Services, Inc., of Portland, Oreg. Typically, call processing center 18 includes a gateway platform 22 configured to receive calls from telephones 16 on telephone network 12. Typically, the call processing center 18 and customer service center 20 are geographically remote from each other, being, for example, located in different buildings or towns. Alternatively, the centers 18, 20 may be in the same building or room.

Figure 3:
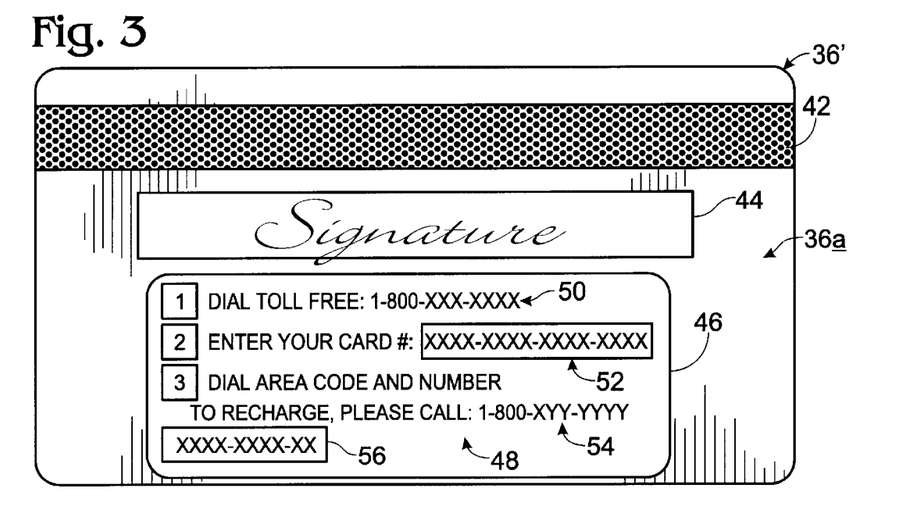
FIG. 3 is a rear view of the backside of a card according to another embodiment of the present invention.

Calling parties may access the gateway platform by dialing a gateway access telephone number, shown at 50 in FIG. 3. Gateway access telephone number 50 typically is a toll-free telephone number, such as an "800" number or international toll-free number. Alternatively, gateway access telephone number 50 may be a long distance number requiring a toll call, a local number, or another predetermined telephone number.

Platform 22 typically includes a call switch 24 connected to telephone network 12, Switch 24 typically is configured to route calls between telephones 16 and a voice recognition unit (VRU) 26. Switch 24 and VRU 26 each are linked to and controlled by a host computer 28. Host computer 28, in turn, is linked to an account database 30, which contains information related to the various accounts on platform 22, as described below. Telecommunications platforms and their constituent switches, host computers, and VRUs are well known in the art and are commercially available from manufacturers such as Phoenix Technologies of Phoenix, Ariz.

Switch 24 is configured to route telephone calls to and from telephone network 12. Calls routed by switch 24 may originate at any of telephones 16, or at VRU 26. Typically, a large number of telephone lines, referred to as trunks, connect the PSTN to the switch. Switch 24 typically is a digital switch, although an analog or circuit-based switch also may be used. Redundant switching devices may be employed to improve telephone network reliability.

Typically, the connection between the calling party's telephone 16a and platform 22 is referred to as a first leg of a telephone call placed with a stored-value calling account. Switch 24 is configured to route the incoming first leg of the call to the VRU. In addition, in response to a request by the host computer 28 and/or VRU 26, the switch 24 is configured to initiate a second leg of the telephone call, that is, to connect the calling party to another telephone 16 on the telephone network 12. Switch 24 may connect, for example, the telephone 16a of the calling party with the telephone 16b of the called party, or with the telephone 16c of the customer service center of a service provider.

VRU 26 is a device configured to answer a call from a telephone 16 and interact with the calling party. The VRU typically presents the calling party with a menu of options related to a service that the calling party intends to use. Typically, the VRU utilizes synthesized or prerecorded voice prompts to present the user a number of menu options. The user may respond by striking keys on the telephone keypad, thereby producing dual tone multiple frequency (DTMF) touch tones. The VRU typically is programmed to respond to these touch tones, and proceed to a submenu of options, or execute a command at the user's request. Alternatively, the VRU may utilize voice recognition software to recognize voice commands spoken by the user.

In a typical calling-card scenario, the VRU will prompt the calling party for an account designator, also referred to as an account number or Personal Identification Number (PIN). As used herein, the terms "account designator," "account number," and "PIN" are used synonymously to refer to a combination of letters, numbers, and/or symbols used to designate a particular account. It will be understood that the term "account number" is not limited to numeric digits. It will also be understood that in the telephone call processing arts, a PIN is typically a 12- or 16-digit account designator. A separate security access code also may be applied to an account to prevent unauthorized use of the account. While such security access codes are referred to as PINs in banking and other arts, herein the term "PIN" will be used synonymously with the terms "account designator" and "account number."

The user typically responds to the VRU prompt by keying in an account number via a telephone keypad or by speaking. After host computer 28 has verified with account database 30 that the account is valid, active, and contains a positive balance, as described below, the VRU will prompt the user for a destination telephone number. Host computer 28 will instruct switch 24 to connect the second leg of the call with the telephone at the destination telephone number. If the balance in the account is too low, or if some other problem with the account is detected by the host computer, the host computer may connect the calling party automatically to telephone 16c of a customer service representative at customer service center 20.

Once the call has been connected to the destination telephone number, the host computer is configured to measure the call according to a predetermined calling unit. Typically, the calling unit is time, measured in seconds. Alternatively, another predetermined calling unit may be used, such as a per-call unit, or a monetary unit, such as dollars and cents.

Once the call has terminated, host computer 28 is configured to bill the calling party's account number for the cost of the call, by altering the account balance associated with the account number in the account database according to the number of calling units used by the calling party.

To assist in calculating the call charge, platform 22 typically includes a rate calculation mechanism, such as a rate table, accessible by host computer 28. The rate table usually is stored in the account database 30. Alternatively, the rate table may be stored in the host computer 28, elsewhere on computer network 12, or in some alternate location. Typically, the rate table includes information on local, domestic long distance, and international rate information. For a particular call, the host computer determines the geographic proximity of the calling party and called party and the time-length of the call, and calculates the total cost of the call using information on the rates for the measured geographic proximity and time length. Alternatively, a formula or other mechanism for computing call cost may be used. For example, all domestic calls may be billed at the same rate, such as 15 cents per minute.

As described above, account database 30 contains information on individual calling accounts on platform 22. Typically, the accounts on the platform are indexed by account number, or PIN. For each PIN, the account database 30 typically contains a database record including an account number field, an account balance field, an active date field, and a cancel date field. A typical database record for a calling account is shown in the following table.

| Database Field | Data Type | Field Size |
| --- | --- | --- |
| Account Number (PIN) | Character | 20 |
| Balance (in seconds) | Numeric | 5 |
| Active Date | Character | 8 (CCYYMMDD) |
| Cancel Date | Character | 8 (CCYYMMDD) |

The Account Number field typically is 20 characters in length and contains an account number or designator in alphanumeric format. The Account Balance field contains the number of calling units on the card, typically measured in seconds, and is 5 numeric digits in length. The Active Date field typically is eight alphanumeric digits in length and contains the date on which the account was activated, in a C(entury) C(entury) Y(ear) Y(ear) M(onth) M(onth) D(ay) D(ay) format, such as 19990615 for Jun. 15, 1999. The Cancel Date field typically contains the date on which the account is to be canceled. The host computer is configured to determine a status of the account, active or inactive, by comparing a current date with the active date and cancel date. Between the active date and cancel date, the account status is active, else it is inactive. The active date also is referred to as the activation date and the cancel date also is referred to as the deactivation date.

Typically, the fields are right-justified and space filled. For example, if a 16-digit PIN is being used, the PIN field might read: "####XXXXXXXXXXXXXXXX", where X represents an alphanumeric digit in the account number and # is a space. Alternatively, the fields may be left-justified, and zero-filled where empty, or of another predetermined type, size and configuration suitable to maintain information relating to the telephone calling account on platform 22.

Host computer 28 also typically is connected via computer network 14 to a customer service server 32. Customer service server 32 also is referred to herein as remote server 32, because it typically is located remote from host computer 28. Host computer 28 typically executes an interface program configured to enable customer service server 32 to communicate with database 30. For example, customer service server 32 is configured to create new accounts and account numbers, check and alter balances, and alter account statuses by changing activation dates and deactivation dates on the database 30. The interface typically is configured to send and receive request and response messages, typically in the form of data packets, between host computer 28 and remote server 32, as described below.

Customer service center 20 also typically includes at least one terminal 34 connected to customer service server 32. A customer service representative (CSR) typically fields a call from a customer on telephone 16c and receives a customer order from a customer, who is typically the owner of a preexisting account. Typically the order is to create a telephone calling account. Alternatively, the customer order may be to alter the balance of calling units on a telephone calling account, or to activate or deactivate an telephone calling account, or for some other service associated with a calling account.

The customer service representative fulfills the customer order by accessing account database 30 through terminal 34 and customer service server 32. For example, the customer service representative may create a new account for the customer by inserting a new PIN into a data record in account database 30. Typically, the new PIN is the same as the account designator of a preexisting account owned by the customer, such as a credit card account.

The customer service representative, upon receiving payment from the customer, also may increase the account balance for the customer's PIN, thereby recharging the calling account. Customer service server 32 also typically is linked to a payment verification server 60 configured to verify credit card account numbers and process payment transactions. Such a verification service is available from Paymentech, Inc., of Dallas, Tex. also having offices in Salem, New Hampshire.

Figure 2:
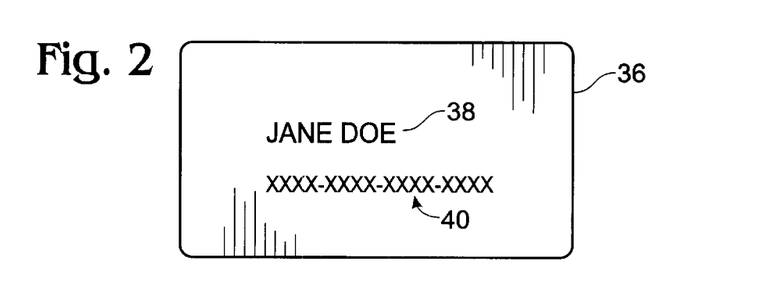
FIG. 2 is a front view of a card according to one embodiment of the present invention.

In FIG. 2, a card 36 is shown that includes the name 38 of the owner of the card and an account number 40. The account and account number of card 36 are created before the creation of a telephone calling account according to one preferred embodiment of the present invention, and therefore are referred to as a preexisting account and a preexisting account number. Card 36 also is referred to as a preexisting card 36. Typically, card 36 is a credit card.

Alternatively, card 36 may be virtually any other type of card having an account number, including but not limited to, mileage cards, rewards cards, membership cards, dining cards, discount cards, bank cards, debit cards, stored-value cards, library cards, etc. The account number may be of virtually any format, such as 16 digits in length, and may include numbers, letters, or other symbols. Typically, the card is not imprinted with the gateway telephone access number, and the card appears as it originally was issued by the issuing organization.

FIG. 3 shows a backside 36a of a card 36' according to another embodiment of the present invention. Backside 36a includes a magnetic strip 42, a signature block 44, and information or indicia 48 relating to the use of a telephone account having the same account number of the preexisting account. Indicia 48 may be affixed to the card via a sticker 46 or may be imprinted directly on the card. Indicia 48 may include a gateway access telephone number 50 of the gateway platform, an account number 52 of the preexisting account for which card 36 originally was issued, and/or a customer service telephone number 54. The front side of card 36' typically resembles card 36 in FIG. 2. It will be noted that account number 54 on the backside 36a of card 36' and account number 40 on the front side of card 36 typically are the same number.

Card 36' also may include a tracking number 56. Tracking number 56 may be used, for example, to determine the type, format, terms, rates, etc., of a telephone account associated with a particular account number. For example, where multiple card types are used to access a single gateway access telephone number on a gateway platform the rates may differ from card to card. Therefore, the tracking number may be used to determine the appropriate rate for a particular calling account. Usually, however, the calling accounts on a single gateway access telephone number all are related to a common preexisting account type and, therefore, have common usage rates, data formats, etc. For example, typically, all calling accounts for credit cards issued by a particular bank share a single "800" number as a gateway access telephone number.

Figure 4:
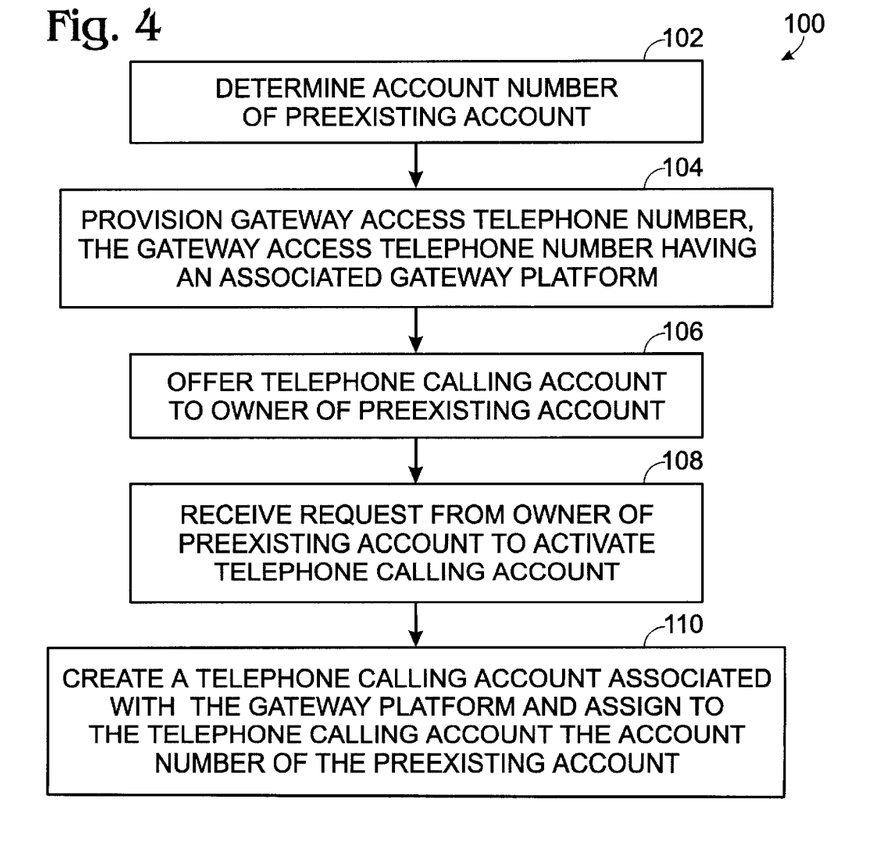
FIG. 4 is a flowchart of a method for creating a telephone calling account according one embodiment of the present invention.

Referring now to FIG. 4, a method for creating telephone calling accounts according to one embodiment of the present invention is shown generally at 100. At 102, the method typically includes determining an account number of a preexisting account. Typically, the preexisting account is a credit card account. Alternatively the preexisting account may be virtually any other type of account having an account number, including but not limited to accounts for mileage cards, rewards cards, membership cards, dining cards, discount cards, bank cards, debit cards, stored-value cards, library cards, etc., and other preexisting accounts not having cards.

Typically, the account numbers are determined in batches. For example, the account numbers may be determined by selecting the account numbers of a group of customers of a company, such as a credit card or other company. Alternatively, the account numbers may be determined one at a time, rather than in a batch.

Typically, the preexisting account is an active account in use by an account owner. Alternatively, the preexisting account may be inactive. For example, the account number may correspond to a preexisting account that has been set aside for a potential customer, but which has not yet been activated. Therefore, a potential customer may be sent an inactive mileage card, for example, that also includes a telephone calling account with the same account number as the mileage card.

At 104, the method typically includes provisioning a gateway access telephone number associated with a gateway platform. Typically, the gateway access telephone number is a toll-free number, such as a domestic toll-free "800" number or an international toll-free number, as described above, Alternatively, the gateway access telephone number may not be a toll-free number. Typically, the gateway telephone number is provisioned after determining the account number. Alternatively, the gateway telephone number may be provisioned before determining the account number, or at some other time.

Typically, each of the account numbers assigned to a particular platform is unique. This ensures that no two customers will share the same account. All of the account numbers associated with a particular gateway access telephone number usually are derived from preexisting accounts of a common type. For example, all account numbers associated with gateway access telephone number 1-800-XXX-XXXX may be from preexisting credit cards issued by a particular bank. This ensures that each account number on the platform is unique, and has the same number of digits. Alternatively, account numbers from a variety of sources may be used on a single gateway telephone number. Where uniqueness of PINs is not assured, an additional identification code may be used to distinguish between identical account numbers on a single gateway access telephone number on a platform.

At 106, the method typically includes offering a calling account to an owner of the preexisting account. The offer typically is made by enclosing a statement insert in an account statement or bill sent to the owner of the preexisting account. The statement insert may be a separate piece of paper, or may be contained within a portion of a printed bill. Alternatively, the offer may be made by sending a direct mailing to the owner of the preexisting account.

The offer informs the owner that the card for the preexisting account may be used as a calling card by dialing an initialization telephone number and speaking with a customer service representative. Alternatively, the offer may be made in person, over the telephone, via e-mail, on a web site, in a print, radio, or television advertisement, or in some other suitable manner.

At 108, the method typically includes receiving a request from the owner of the preexisting account to create a telephone calling account with the account number of the preexisting account. Typically, the request is received when the owner of the account calls the customer service representative at customer service center 20 and requests initialization of the telephone calling account. Alternatively, the request may be received through an Internet web site, e-mail, or written communication from the owner of the account, or in some other suitable manner.

At 110, the method typically includes creating a telephone calling account on the platform and assigning to the calling account the account number of the preexisting account. Typically, the customer service representative receives the call from the owner of the preexisting account on telephone 16c and inputs via terminal 34 a command to create the telephone calling account on platform 22. Creation of the calling account and assignment of the account number of the preexisting account at 100 will be understood more readily with reference to FIG. 5, discussed below.

Typically, the creation of the telephone calling account with the same account designator as the preexisting account does not alter or impair the functionality of the preexisting account. Therefore, the owner may continue to use the preexisting account as it had been used in the past, while additionally using the newly created telephone calling account.

Figure 5:
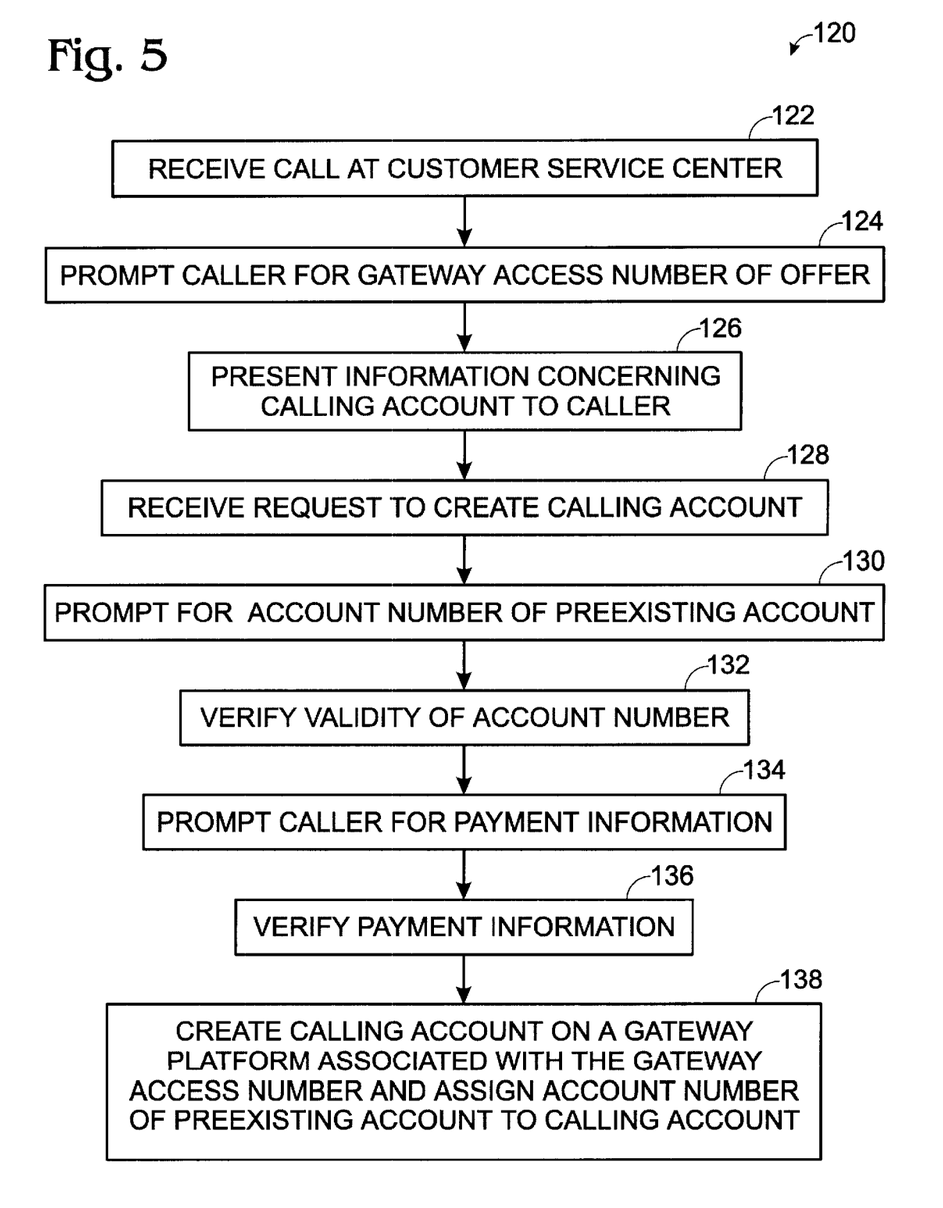
FIG. 5 is a flowchart of a method for activating a telephone calling account according to one embodiment of the present invention.

In FIG. 5, a method for creating a telephone calling account according to one embodiment of the present invention is shown generally at 120. The method typically includes receiving a call to an initialization telephone number, from the owner of a preexisting account at a customer service center. Typically, the initialization telephone number and recharge customer service number 54 are the same number, such as 1-800-PREPAID®, operated by Carrier Services of Portland, Oreg. Alternatively, initialization number and recharge customer service number may be virtually any other telephone number, and may not be the same telephone number. The call usually is answered by a customer service representative on telephone 16c. Alternatively, the owner of the preexisting account may contact the customer service center by dialing the gateway access telephone number and being routed to the customer service center, or by another non-telephonic method, as described above. The routing from the platform to the customer service center may be automatic, or may occur upon caller selection of a menu option in a voice response menu provided by VRU 26.

At 124, the method typically includes prompting the calling party for a gateway access telephone number. Typically, the gateway access telephone number has been communicated to the owner of the preexisting account in a direct mailing or other offer sent to the owner offering to add the telephone calling account functionality to the account number of the preexisting account, as described above. Typically, the gateway access telephone number is an "800" number other than 1-800-PREPAID®. Typically, the prompt is communicated by a live customer service representative. Alternatively, the prompt may be a communicated by a computer-synthesized voice or prerecorded voice. Where the caller is calling from a text-enabled telephone, such as a computer terminal configured for VOIP telephony, the prompt may be contained in text or graphics transmitted to the owner of the preexisting account.

At 126, the method typically includes presenting information concerning the calling account to the owner of the preexisting account. The information typically includes the telephone rates, minimum incremental telephone-time purchase amount, expiration date, etc., related to the account. This information typically varies from offer to offer, and may depend upon the type of preexisting account.

At 128, the method typically includes receiving a request to create a calling account from the owner of the preexisting account. Typically, the request is received via a telephone. Alternatively, the request may be received via another communication method, as described above.

At 130, the method typically includes prompting the owner of the preexisting account for the account number of the preexisting account. The prompt typically is given in the same manner as the prompt at 124, although a different manner, such as live voice, may be used. At 132, the method typically includes verifying the validity of the account number of the preexisting account. Typically, this is achieved by querying verification server 60 and receiving the status of the account number. Alternatively, verification of the validity of the account number may be achieved by directly contacting the issuing organization associated with the preexisting account.

At 134, the method typically includes prompting the caller for payment information, such as a credit card number, and receiving authorization to charge a predetermined amount to the user. At 136, the method typically includes verifying the payment information. Typically, the verification of payment information is achieved by querying the verification server 60. In one preferred embodiment of the invention for use with credit cards, the initial payment is made on the preexisting credit card account, and verification of the validity of the account number and verification of the payment information are both performed in one query to a credit card verification service.

At 138, the method includes creating a calling account on the gateway platform associated with the gateway access telephone number and assigning an account number of the preexisting account to the calling account. This is typically accomplished by sending a message via the customer service representative terminal 34, through the customer service server 32 to host computer 28. A response may be sent from the host server back to the customer service server to confirm the transaction was completed, or report an error.

Typically, the message sent from the customer service server 32 to host computer 28 is an ASCII character string with the following format.

| Field Name | Data Type | Size | Description |
| --- | --- | --- | --- |
| Request Date | Character | 8 | Date of the request in CCYYMMDD format. |
| Request Time | Character | 8 | Time of request in HHMMSS format. |
| Client ID | Character | 10 | Identification of Client of Call Processing Center, i.e., the name of the Customer Service Center. |
| Store ID | Character | 10 | Identification of the specific location of the customer service representative. |
| Device ID | Character | 5 | Identification of the device (terminal) within the location. |
| Product ID | Character | 10 | Identification of this product. |
| PIN Action | Character | 2 | Transaction requested. |
| PIN Number | Character | 20 | Account/PIN number to apply the request. |
| PIN Type | Character | 1 | Host assigned or remotely assigned. |
| PIN Seconds | Numeric | 5 | Seconds to apply to the PIN (if applicable). |
| PIN Date | Character | 8 | Date to apply to the PIN in CCYYMMDD format (if applicable). |
| Control Information | Character | 20 | For customer use. Passed through unchanged. |

The Request Date field in the Request Packet typically contains the date of the request in the CCYYMMDD format. For example Jun. 15, 1999 would be indicated 19990615. The Request Time field in the Request Packet typically contains the time of the request in the HHMMSS format, in 24 hour time. For example, 3:05:04 pm would be indicated 150504. The Client ID, Store ID, and Device ID respectively designate the customer service provider, branch, and the particular client terminal 34 making the request to the host server. The Product ID designates the particular product offer to which the request applies, for example, a stored-value calling card with a flat rate of 15 cents a minute for all domestic calls.

The PIN Number field contains the account designator or PIN to which the requested PIN Action should be applied. The PIN Type field designates whether the PIN is assigned remotely by the customer service center 20 or is assigned internally by the gateway platform 22. Typically, the PIN Type is set to "C" for "Custom" if the PIN is to be assigned remotely by the customer service server, and is set to "S" for "Standard" if the PIN is an internally or locally assigned PIN.

The PIN Seconds field includes the number of calling units in the account. Typically, the calling units are seconds, although other calling units may be used, as described above. The PIN Date field typically contains a date to apply to the PIN, and is used when setting the active date or cancel date of the PIN. The Control Information field may be used by the service provider to include information such as a tracking number related to the account.

The PIN Action field in the request packet typically contains one of the following codes to command the host computer 28 to perform a task related to the PIN.

| PIN Action | Name | Descriptions |
| --- | --- | --- |
| PA | PIN Activate | Set active date to today, extend cancel date. |
| PC | PIN Cancel | Set cancel date to today. |
| PD | PIN Deactivate | Deactivate PIN. |
| PI | PIN Insert | Create a new PIN, set active date to today, extend cancel date, set seconds to the value in the PIN Seconds field. This command is only available when the PIN Type is custom. |
| PK | PIN Kill | Make the PIN invisible to the platform. |
| PQ | PIN Query | Return active date, cancel date, and PIN Seconds. |
| PS | PIN Set | Set active date to today, extend cancel date, set seconds to value in the PIN Seconds field. |
| PU | PIN Unkill | Make PIN visible to platform. |
| PZ | PIN Zap | Set seconds to zero. |
| TA | Time Add | Add the value in the PIN Seconds field to the seconds in the account. |
| TM | Time Minus | Subtract the value in the PIN Seconds field to the seconds in the account. |
| TS | Time Set | Set the seconds in the account to the value in the PIN Seconds field. |
| DA | Date Active | Set the active date to the value in the PIN Date field. |
| DC | Date Cancel | Set the cancel date to the value in the PIN Date field. |
| HB | Heart Beat | Use to make sure the host server is alive and able to respond. |

The PIN Activate command sets the active date to the current day (day of request), and extends the cancel date by a predetermined length of time, typically one year. Alternatively, the cancel date may be extended two years, ten years, or some other length of time. The PIN Cancel command cancels the pin effective immediately, on the date of the request, by setting the cancel date to the current day. Alternatively, the PIN cancel command may set the cancel date for the account to another predetermined date. The PIN Deactivate command deactivates the account, without canceling it or removing it from account database 30.

The PIN Insert command creates a new PIN on platform 22. The PIN Insert command typically creates a new database record in database 30, and sets the account number filed of the database record to the account number, or PIN, sent in the PIN Number field of the request packet containing the PIN Insert column. The PIN Insert command also typically sets the active date of the PIN to the current day, and sets the cancel date of the PIN to a date that is a predetermined length of time away from the current day, such as one year, two years, or other length of time. In addition, the PIN Insert command typically sets the balance in the account to the value in the PIN Seconds field of the current request packet. Typically, the PIN Insert command is available only where the PIN Type field in the current request packet is set to custom.

The PIN Kill command makes the PIN invisible to the platform, thereby preventing further use of the PIN by the owner of the account. This is useful to prevent fraud by those users suspected of committing fraud.

The PIN Query command returns the active date, cancel date, and PIN Seconds, or balance, for the account identified in the PIN Number field. This is useful to determine whether an account is active, and how much calling time is on an account.

The PIN Set command sets the active date of the PIN in the PIN Number field to the current day and sets the cancel date to a date that is a predetermined length of time away from the current day, such as one year, two years, or other length of time. In addition, the PIN Set command sets the balance of calling units on the account to the value in the PIN Seconds filed of the current packet. The PIN Set command is useful in initiating or recharging a customer's account.

The PIN Unkill command makes the PIN visible to the platform and host computer. This command is used to revive an account that has been killed in the past.

The PIN Zap command sets the balance of calling units in the account to zero. The Time Add command adds the value in the PIN Seconds field to the balance in the account. The Time Minus command subtracts the value in the PIN Seconds field from the balance in the account. The Time Set command sets the time in the account to the value in the PIN Seconds filed. Together, the PIN Zap, Time Add, Time Minus, and Time Set commands may be used to set the balance in the account to virtually any value, without disturbing other data related to the account.

Finally, the Heart Beat command is a command that alters no data in the account database, but merely requests a response verifying that the host computer and/or database are operational. This is used to verify that the host computer is not down, particularly where the host server takes a long time to respond.

Typically, the response from the host computer 28 to the remote server 32 is an ASCII string in the following format.

| Field Name | Data Type | Size | Description |
| --- | --- | --- | --- |
| Response Date | Character | 8 | Date of the response in CCYYMMDD format. |

-continued

| Field Name | Data Type | Size | Description |
| --- | --- | --- | --- |
| Response Time | Character | 8 | Time of response in HHMMSS format. |
| Client ID | Character | 10 | Same as request. |
| Store ID | Character | 10 | Same as request. |
| Device ID | Character | 5 | Same as request. |
| Confirmation | Character | 10 | Mod10 confirmation number. |
| PIN Action | Character | 2 | Same as request. |
| Result Code | Character | 2 | Result of operation (see table below). |
| PIN Number | Character | 20 | PIN number to apply the action. |
| PIN Seconds | Numeric | 5 | Seconds currently on PIN, will be seconds before set to zero for PZ PIN Action. |
| PIN Active | Character | 8 | Active date currently on the PIN in CCYYMMDD format. |
| PIN Cancel | Character | 8 | Cancel date currently on the PIN in CCYYMMDD format. |
| Control Information | Character | 20 | For customer use, passed through unchanged. |

The Response Data is an eight-character field including the date of the response in the CCYYMMDD format. The Response Time is an eight-character field including the response time in 24-hour time in the HHMMSS format. These two fields aid in determining the exact date and time of response from the host computer and database.

The Client ID, Store ID, Device ID, and PIN Action fields each typically contain the same information that was received in the request packet for those fields. The confirmation field is a MOD 10 number used to show that the data was exchanged successfully among the host computer 28, account database 30, and remote server 32.

The PIN Number field typically contains the PIN number to which the requested action was applied, and typically is the same in the request and response packet. The PIN Seconds field typically contains the number of calling units currently in the balance field of the account. If a PIN Zap command was sent in the request packet, the number of seconds erased from the PIN will be returned in the PIN seconds field.

The PIN Active field typically contains the active date currently in the account database for the PIN in issue. Likewise, the PIN Cancel field typically includes the cancel data currently stored in the account database for the PIN.

The Control Information field is for the service provider's use, as described above, and is passed through from the request packet to the response packet unchanged.

Finally, the following codes may be used in the Result Code field of the above described response from the host computer 28 to customer service server 32.

| Result Code | Description |
| --- | --- |
| 00 | Transaction successful |
| 01 | PIN number not found |
| 02 | PIN number already cancelled |
| 03 | PIN number already active |
| 04 | PIN in use |
| 05 | Invalid Client ID |
| 06 | PIN database error |

-continued

| Result Code | Description |
| --- | --- |
| 07 | PIN insert error |
| 08 | Invalid PIN Action |
| 09 | Invalid Product ID |
| 10 | PIN database invalid |
| 12 | PIN update error |
| 13 | SEQ database invalid (Used for confirmation) |
| 14 | Could not generate confirmation |
| 15 | SEQ database error |
| 16 | PIN has been used |
| 17 | PIN is cancelled |
| 18 | PIN has not been activated |

It will be understood that the above data formats for the request and response messages sent between customer service server 32 and host server 28 are for illustrative purposes. Many other commands in a virtually limitless variety of data formats may be exchange between customer service server 32 and host server to add, delete, and change information in the account database 30 related to the telephone calling accounts on the platform 22.

Figure 6:
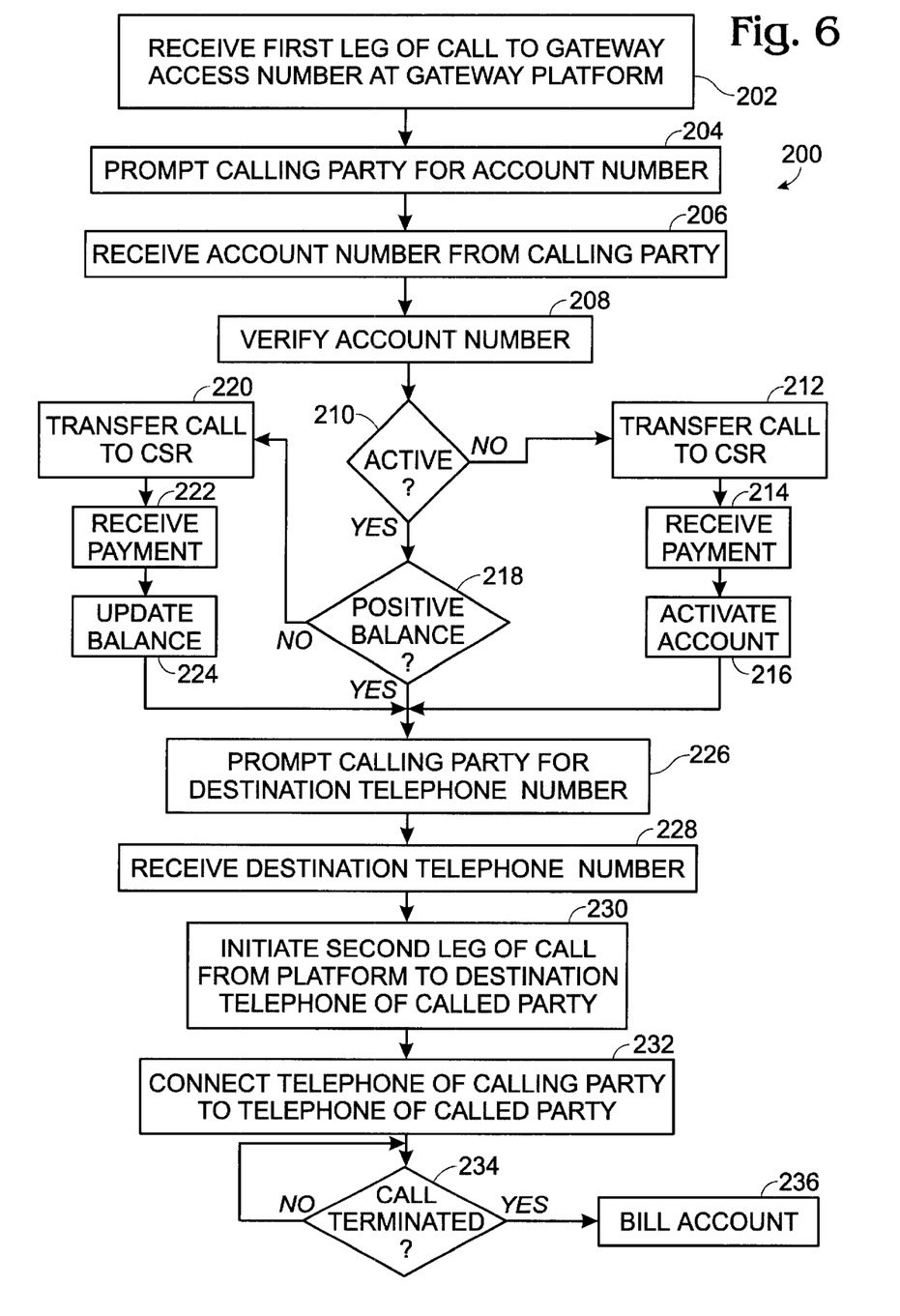
FIG. 6 is a flowchart of a method for placing a telephone call according to one embodiment of the present invention.

As shown in FIG. 6, a method 200 for placing a telephone call may be practiced according to one embodiment of the present invention. At 202, the method typically includes receiving a first leg of a call from a calling party at a gateway access telephone number associated with a gateway platform. Typically, the gateway access telephone number is a toll-free "800" number, as described above.

At 204, the method typically includes prompting the calling party for an account number of a calling account. The account number is identical to an account number of a preexisting account, such as a credit card account or mileage account, as described above. At 206, the method typically includes receiving the account number of the calling account from the calling party. Typically, the calling party keys in the account number to a telephone keypad. Alternatively, the calling party may speak the account number or communicate the account in another manner, as described above.

At 208, the method typically includes verifying the account number. Typically, verifying the account number is accomplished by querying the account database 30 and receiving a response from the host server that the account number exists and is valid and active.

At 210, the method typically includes determining whether the account number is active. Typically, determining whether the account number is active is accomplished by querying database 30 to determine whether the current date is between the active date and cancel date for the account, as described above. If the account is not active, the method typically includes automatically transferring the call via switch 24 and telephone network 12 to a telephone 16*c* of a customer service representative.

At 214, the method typically includes requesting and receiving payment from the customer. At 216, once payment is received, the method typically includes updating the account by activating the account and setting the balance in the account to an appropriate amount corresponding to the amount paid by the calling party, less any outstanding debt owed by the calling party to the service provider.

At 218, the method typically includes determining whether there is a positive balance in the account. Typically, determining whether there is a positive balance in the account is accomplished by sending the PIN Query command from the host server 28 to the account database 30. If the balance in the account is negative or insufficient to place a call, the method typically includes, at 220, transferring the call to the customer service center and, at 222, requesting and receiving from the calling party payment for additional calling units on the calling account. At 224, the method includes updating the balance of calling units in the calling account database record in account database 30.

At 226, the method typically includes prompting the calling party for a destination telephone number. The prompt may be a live, synthesized, or prerecorded voice prompt, or another type of prompt, such as a text prompt on a multimedia telephone. At 228, the method typically includes receiving a destination telephone number from the calling party. Typically, the destination telephone number is entered via a touch-tone keypad on the calling party's telephone.

At 230, the method typically includes initiating a second leg of the call from the gateway platform to the destination telephone 16*b* of the called party. At 232, the method typically includes connecting the first leg of the call to the second leg of the call, such that the telephone 16*a* of the calling party and the telephone 16*b* of the called party are connected via telephone network 14. Initiating the second leg and connecting telephones 16*a*, 16*b* may be accomplished substantially simultaneously.

At 234, the method typically includes determining whether the call has been terminated. At 236, if the call has been terminated, the method typically includes billing the calling account of the calling party for the cost of the call. Typically the cost of the call is determined using an associated rate table, as described above. Billing the calling account typically is accomplished by subtracting a calculated number of calling units, such as seconds, from the balance associated with the calling account, and storing the new total as the balance in the PIN Seconds field in account database 30.

While the invention has been disclosed in its preferred form, the specific embodiments thereof as disclosed and illustrated herein are not to be considered in a limiting sense because numerous variations are possible. The subject matter of the invention includes all novel and non-obvious combinations and subcombinations of the various elements, features, functions, and/or properties disclosed herein. No single feature, function, element, or property of the disclosed embodiments is essential. The following claims define certain combinations and subcombinations which are regarded as novel and non-obvious. Other combinations and subcombinations of features, functions, elements, and/or properties may be claimed through amendment of the present claims or presentation of new claims in this or a related application. Such claims also are regarded as included within the subject matter of the present invention, irrespective of whether they are broader, narrower, or equal in scope to the original claims.

We claim:

1. A method of creating a telephone calling account on a calling platform, the method comprising:

receiving a request related to a preexisting account having a preexisting account number, the request being to create a telephone calling account having the same account number as the preexisting account, wherein the preexisting account has an associated account number that enables the owner to use the account for a non-telephone-related function;

obtaining the preexisting account number of the preexisting account;

creating a new telephone calling account on the calling platform;

creating a PIN for the new telephone calling account that is different from a security PIN for a bank account, and that is the same as the preexisting account number of the preexisting account;

assigning to the telephone calling account the newly created PIN; and activating the telephone calling account;

wherein, after creation of the telephone calling account, the same number may be used as the account number for the non-telephone related purpose, and as the PIN for the telephone calling account.

2. The method of claim 1, where the telephone calling account is configured to enable the owner to call the calling platform and be connected to a destination telephone number.

3. The method of claim 1, where the preexisting account is a credit card account.

4. The method of claim 1, where the preexisting account is a mileage card account.

5. The method of claim 1, where the preexisting account is a dining card account.

6. The method of claim 1, where the preexisting account is a banking account.

7. The method of claim 1, where the preexisting account is a membership account.

8. The method of claim 1, where the preexisting account is an inactive account.

9. The method of claim 1, where the inactive preexisting account has been set aside for a potential customer, but has not yet been activated.

10. The method of claim 1, where the request is received from the owner of the preexisting account.

11. The method of claim 10, wherein receiving the request includes receiving a call from the owner of the preexisting account.

12. The method of claim 11, where the call from the owner is received at a customer service center.

13. The method of claim 11, where the call from the owner is received at a card-initialization telephone number.

14. The method of claim 13, where the card-initialization telephone number is a toll-free number.

15. The method of claim 10, further comprising, prompting the owner for a gateway access telephone number associated with the telephone calling account.

16. The method of claim 10, further comprising, presenting information concerning the telephone calling account to the owner of the preexisting account.

17. The method of claim 10, further comprising prompting the owner of the telephone calling account for the preexisting account number of the preexisting account.

18. The method of claim 10, further comprising receiving from the owner of the preexisting account the preexisting account number.

19. The method of claim 18, further comprising verifying the validity of the preexisting account number.

20. The method of claim 10, further comprising prompting the owner of the preexisting account for payment information.

21. The method of claim 20, further comprising receiving payment information from the owner of the preexisting account.

22. The method of claim 21, further comprising verifying the payment information.

23. The method of claim 1, further comprising sending a request message from a first computer to a host computer to instruct the host computer to create a calling account on the calling platform.

24. The method claim 23, further comprising sending a response message from the host computer to the first computer to verify the creation of the telephone calling account.

25. The method of claim 23, where the first computer is located at a customer service center and the host computer is located at a gateway platform.

* * * * *